US010135322B2

(12) United States Patent
Vohlgemuth

(10) Patent No.: US 10,135,322 B2
(45) Date of Patent: Nov. 20, 2018

(54) ALTERNATOR ROTOR HAVING ELECTRONIC COMPONENTS PLUGGED AND LOCKED MECHANICALLY IN PLACE

(71) Applicant: MOTEURS LEROY-SOMER, Angouleme (FR)

(72) Inventor: Patrick Vohlgemuth, La Rochefoucauld (FR)

(73) Assignee: MOTEURS LEROY-SOMER, Angouleme (FR)

( * ) Notice: Subject to any disclaimer, the term of this patent is extended or adjusted under 35 U.S.C. 154(b) by 493 days.

(21) Appl. No.: 14/419,079

(22) PCT Filed: Jul. 26, 2013

(86) PCT No.: PCT/IB2013/056147
§ 371 (c)(1),
(2) Date: Feb. 2, 2015

(87) PCT Pub. No.: WO2014/020510
PCT Pub. Date: Feb. 6, 2014

(65) Prior Publication Data
US 2015/0222163 A1   Aug. 6, 2015

(30) Foreign Application Priority Data
Aug. 1, 2012 (FR) ...................... 12 57502

(51) Int. Cl.
*H02K 11/04* (2016.01)
*H02K 11/042* (2016.01)
(52) U.S. Cl.
CPC ................. *H02K 11/042* (2013.01)

(58) Field of Classification Search
CPC ... H02K 11/042; H02K 11/04; H02K 2211/03
(Continued)

(56) References Cited

U.S. PATENT DOCUMENTS 5,109,171 A * 4/1992 Schmider ............... H02K 5/24
310/180
2006/0284499 A1   12/2006 Rubbo et al.
(Continued)

FOREIGN PATENT DOCUMENTS

| EP | 1734644 A1 | 12/2006 |
|----|-----------|---------|
| EP | 1788693 A1 | 5/2007 |
| FR | 2944655 A1 | 10/2010 |

OTHER PUBLICATIONS

Nov. 6, 2013 International Search Report issued in International Patent Application No. PCT/IB2013/056147.
(Continued)

*Primary Examiner* — Michael Andrews
(74) *Attorney, Agent, or Firm* — Oliff PLC

(57) ABSTRACT

Alternator rotor, comprising:
  a set of polar wheel field windings,
  an exciting armature, and
  an electronic power supply circuit supplying power to the set of polar wheel field windings from the exciting armature,
the rotor being characterized in that the electronic power supply circuit comprises a bearing made of insulating material and conducting tracks held by said bearing, these tracks connecting the exciting conductors to terminals into which electronic components of the electronic power supply circuit are plugged and locked mechanically in place.

13 Claims, 3 Drawing Sheets

Figure 1:
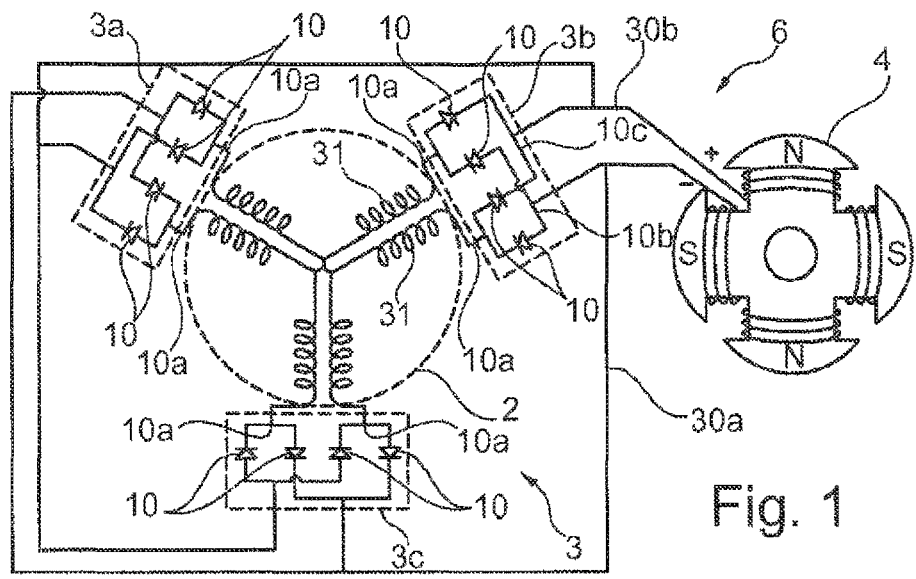

(58) Field of Classification Search
USPC .................................... 310/68 D, 71, 68 R
See application file for complete search history.

(56) References Cited

U.S. PATENT DOCUMENTS

| | | | | |
|---|---|---|---|---|
| 2007/0108854 | A1* | 5/2007 | Osborn | ............... H02K 11/042 310/68 D |
| 2010/0123373 | A1 | 5/2010 | Snider et al. | |
| 2010/0283357 | A1* | 11/2010 | Lemmers, Jr. | ....... H02K 11/042 310/68 D |
| 2011/0268593 | A1* | 11/2011 | Yamada | ................. F04B 35/04 310/68 D |

OTHER PUBLICATIONS

Translation of Nov. 6, 2013 International Written Opinion issued in International Patent Application No. PCT/IB2013/056147.

* cited by examiner

ALTERNATOR ROTOR HAVING ELECTRONIC COMPONENTS PLUGGED AND LOCKED MECHANICALLY IN PLACE

The present invention relates to alternators and, more particularly, to alternator rotors.

Most of the known alternators used in industrial electricity generator sets are of the "brushless" type, being fitted with an electromagnetic excitation system and with a main machine. It is therefore necessary to arrange an electronic power supply circuit, notably a rectifier, between the exciting armature and the set of polar wheel field windings of the main machine so as to supply the polar wheel with direct current.

Known rotary rectifiers are made up of diodes in an elemental casing, of varying formats, connected in such a way that they form a three-phased rectifier bridge. These diodes are assembled and connected on bearings of varying forms that provide electrical insulation with respect to the metallic masses of the alternator and which provide continuity from the windings of the exciting armature to the windings of the polar wheel.

Constructing and/or assembling such rectifiers entails the use of a great many different components in addition to the diodes, for example electric wires and insulators, connection components and fixings.

Patent Application US 2010/0283357 describes an alternator rotor having a rectifier including diodes held between bosses of elastic conducting blades and the inner surface of conducting rings of the rectifier.

Furthermore, because diodes are components which have a limited capacity to withstand current, they are included among those components of an alternator that require running maintenance. The known methods of mounting and of connection require a relatively lengthy disconnection and removal time because, in order to extract the diodes, the inputs from the exciting armature, the outputs leading to the polar wheel and the fixings usually all have to be disconnected.

There is a need to simplify the mounting of the electronic power supply circuit for the set of polar wheel field windings of an alternator and to make alternator electric component maintenance easier.

The invention seeks to meet this need and accomplishes this objective by virtue of an alternator rotor, comprising:
 a set of polar wheel field windings,
 an exciting armature, and
 an electronic power supply circuit supplying power to the set of polar wheel field windings from the exciting armature,
the rotor being characterized by the fact that the electronic power supply circuit comprises a bearing made of insulating material and conducting tracks held by said bearing, these tracks connecting the exciting conductors to terminals into which electronic components of the electronic power supply circuit are plugged and locked mechanically in place.

By virtue of the invention, the electronic components can easily be removed from the rotor for replacement and/or testing, making the alternator easier to maintain, no intervention on the connections being required.

The bearing may be made of an insulating plastics material, for example a thermoplastics material such as polyamide.

The terminals may be produced monolithically with at least a part of the conducting tracks. The terminals may thus constitute connectors of the fast on type, preferably female, the electronic components being provided with complementary connectors of the fast on type, preferably male. The terminals may notably be produced by bending the metal used to make the conducting tracks, with the said metal having been cut out from sheet.

In alternative forms, other types of connector may be used, depending on the components available on the market.

The use of terminals in the form of connectors allows the electronic components of the electronic supply circuit to be mounted simply and securely on the bearing by plugging-in. The direction of plugging-in is preferably parallel to the axis of rotation of the rotor.

The conducting tracks may be electrically connected to the inserts such as threaded studs allowing the connection of cable terminals which are connected for example to the cables of the set of polar wheel field windings. The conducting tracks are, for example, produced with widenings through which the studs pass. These studs may be fixed to the bearing by overmoulding. A varistor, mounted on a printed circuit, used as a voltage clipper between the + and − terminals of the DC bus with a view to protecting the diodes from a returning voltage spike under certain conditions of use, may be mounted on the studs.

The number and type of electronic components in the electronic power supply circuit may vary according to the various embodiments of the invention.

The electronic components may be diode bridges, in which case they are preferably single-phased. The exciting armature is advantageously three-phased and double-wounded, a diode bridge then being associated with each phase. The diode bridges may be interconnected so as to obtain a three-phased double rectifier.

Thus, the electronic power supply circuit in one embodiment of the invention comprises three electronic components each consisting of a single-phased diode bridge. Each bridge comprises four diodes of relatively low rated capacity and therefore of lower cost. The doubling of the three-phased winding of the exciting armature combined with the double three-phased rectifier means that a high intensity DC current can be delivered to the polar wheel despite the low individual rated capacity of the diodes, and this is particularly advantageous.

The mechanical locking of the electronic components in the terminals may be achieved by bolting. For preference, inserts such as threaded studs are permanently present on the bearing, and the components have an opening which is fitted over a corresponding stud, then a nut is fitted onto the stud. The latter may be fixed to the bearing by overmoulding.

The conducting tracks may be held on the bearing by overmoulding. As an alternative, the tracks are held by reliefs of the bearing, being an add-on to the latter.

The bearing may be produced as a single part, by moulding thermoplastics material.

In an alternative form, the bearing is produced in several pieces, for example a base and a cover. Paths may be formed in the base to accommodate the conducting tracks, these then notably being held in place by reliefs of the base.

The cover of the bearing advantageously comprises openings laid out in such a way that the terminals and the threaded studs intended for locking the electronic components are accessible from the outside. The openings in the cover that provide access to the terminals may have inclined facets that facilitate the plugging-in operation, by converging toward the plug-in axis and the terminal.

The terminals may be housed in housings provided on the bearing, and defined by walls moulded with this bearing. These housings preferably have a rectangular cross section when the terminals are of the fast on type, with at least one slot for the passage of the conducting track connected to the terminal.

The bearing is preferably placed on the rotor in such a way that the terminals are accessible from the outside, allowing for easy fitting and removal of the electronic components.

The bearing is preferably placed on a face of the exciting armature, with the terminals projecting outwards.

The bearing can be held in place by screws which screw for example into the magnetic laminations of an exciting armature.

In another of its aspects, the invention relates to an alternator comprising a rotor according to the invention, as defined hereinabove.

Figure 2:
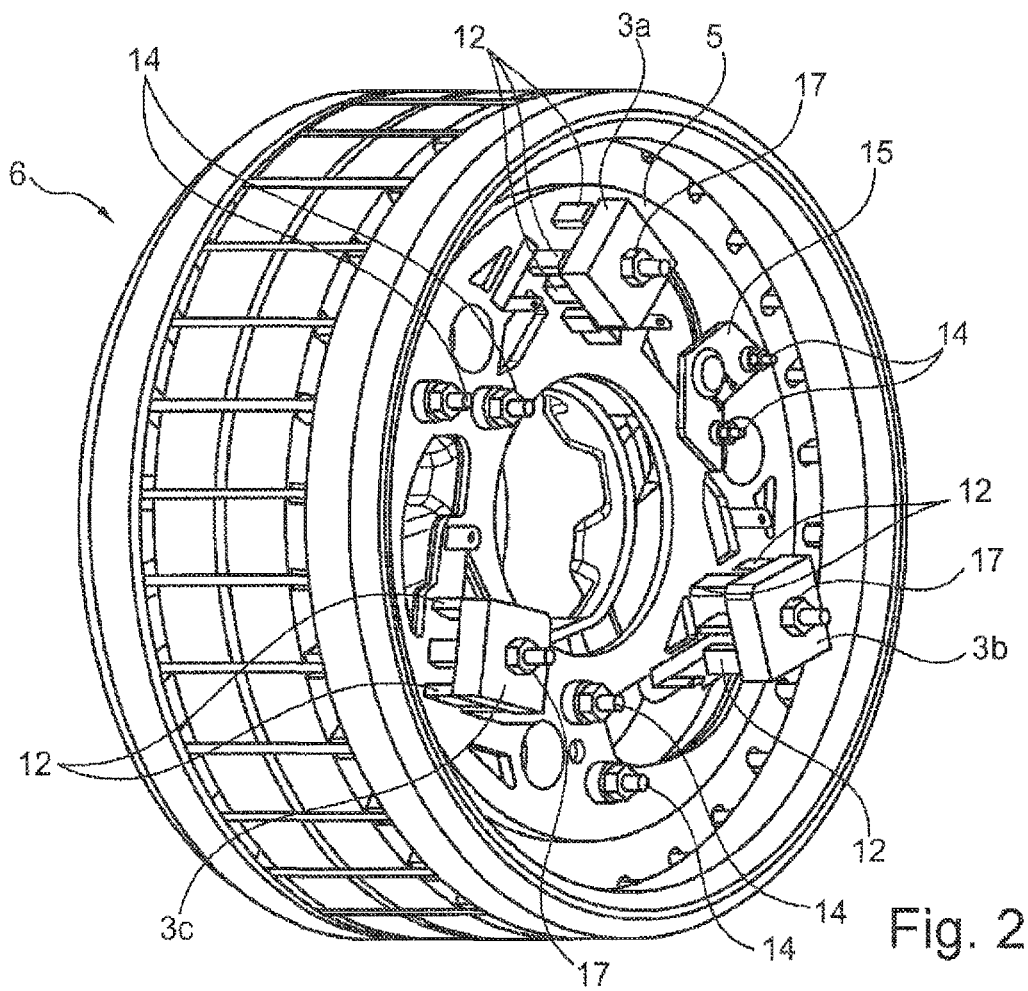
Figure 3:
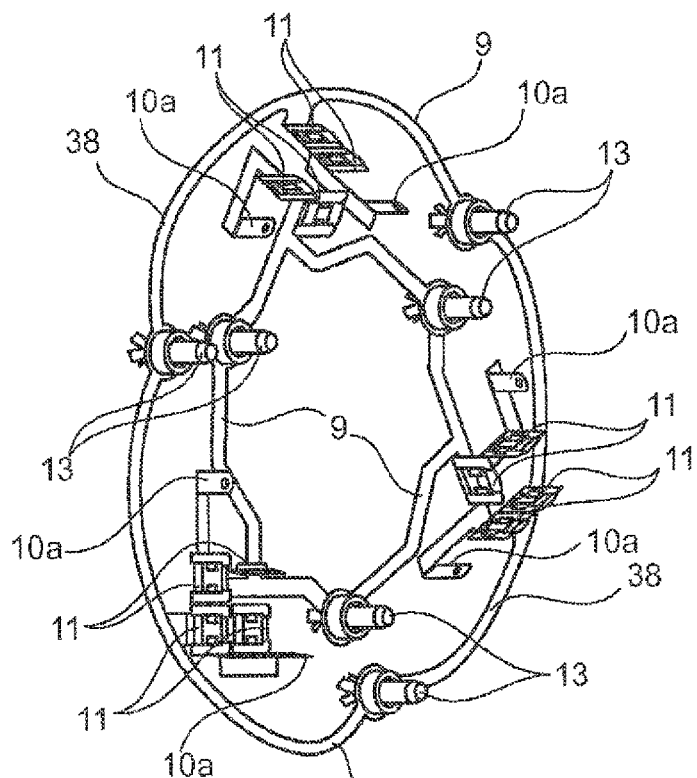
Figure 4:
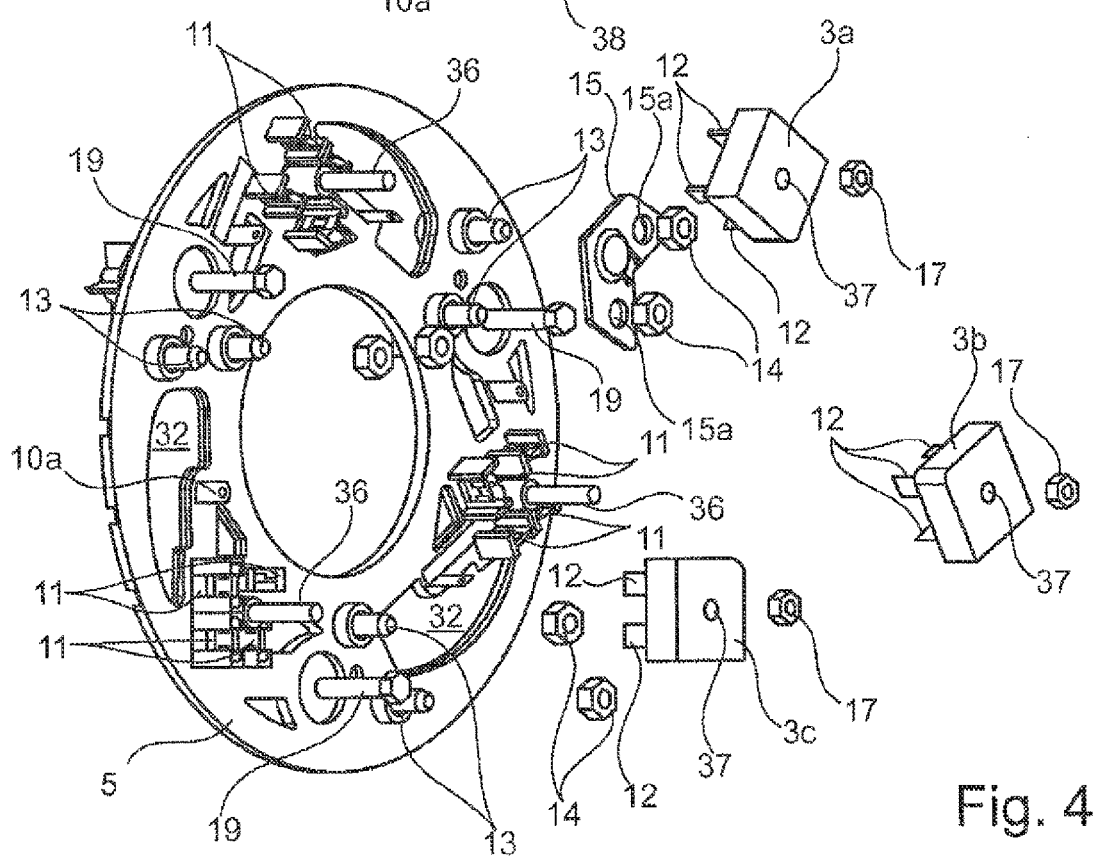
Figure 5:
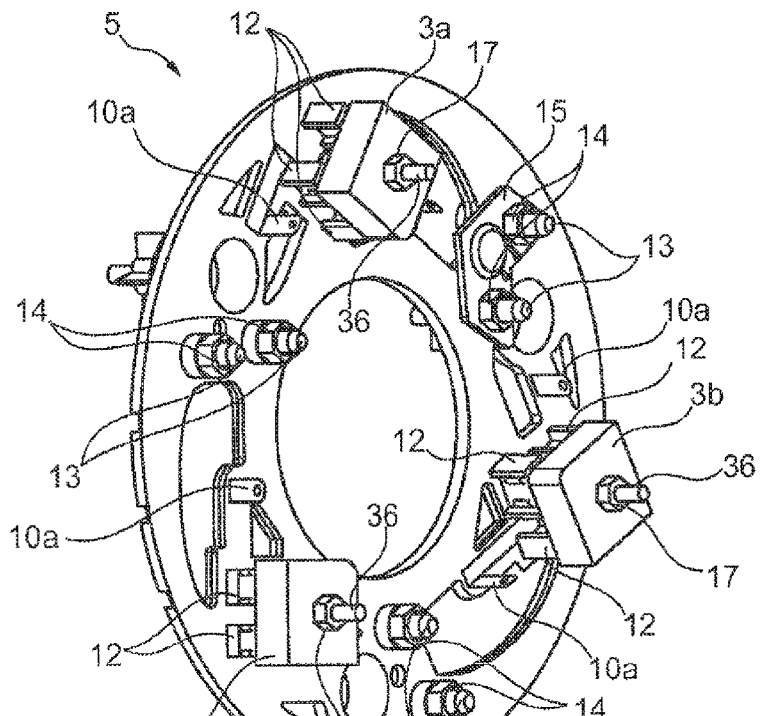
Figure 6:
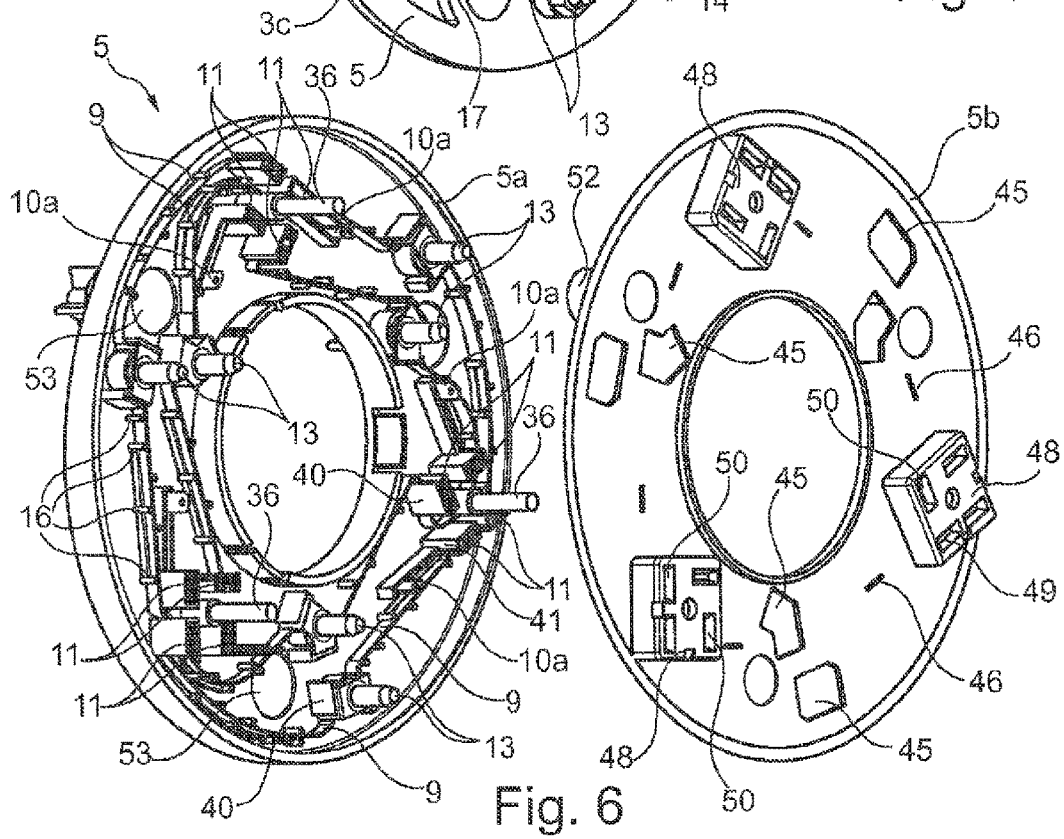

The invention may be better understood from reading the following detailed description of some nonlimiting embodiments thereof, and from studying the attached drawing in which:

FIG. 1 is a schematic depiction of an electric circuit of one example of a rotor according to the invention, FIG. 2 is a schematic and partial perspective depiction of a rotor according to the invention, FIGS. 3 to 5 illustrate the installation of various elements on a bearing according to the invention, and FIG. 6 depicts an alternative form of embodiment of the power supply circuit according to the invention.

An alternator rotor 6 according to the invention, depicted schematically in FIG. 1, comprises a set of polar wheel field windings 4, an exciting armature 2, and an electronic power supply circuit 3 supplying power to the set of polar wheel field windings 4 from the exciting armature 2.

In the example described, the exciting armature 2 is three-phased and double-wounded, but it could have a different number of phases and a different arrangement.

The electronic power supply circuit 3 comprises, in the example described, three electronic components 3a, 3b, 3c each consisting of a single-phased diode bridge comprising four diodes 10.

Each diode bridge is associated with one phase of the exciting armature 2, the three bridges being interconnected to one another as illustrated in FIG. 1. In particular, two diodes mounted top to tail in one bridge have a common junction connected to one terminal of a winding 31 of one phase and on their respective − and + outputs 10b and 10c deliver onto a DC bus 30a, 30b connected to the set of polar wheel field windings 4. The double-winding of the coil is obtained by winding in the conventional way but with two wires in parallel rather than just one.

As depicted in FIG. 2, the electronic power supply circuit 3 comprises a bearing 5 made of insulating material, advantageously made of a thermoplastics material, notably bearing the electronic components 3a, 3b, 3c.

The power supply circuit 3 comprises conducting tracks 9 connecting threaded studs 13 to terminals 11, as depicted in FIG. 3.

Cable terminals, which have not been depicted in FIG. 4, and which are connected to the cables of the set of polar wheel field windings 4, are fixed to the studs 13.

A printed circuit bearing a varistor 15, visible in FIG. 4, provided with holes 15a for the passage of the studs 13, may be fixed to the latter at 120° from the said cable terminals.

As depicted in FIG. 2, the bearing 5 is preferably arranged on an exterior face of the exciting armature 6, in such a way that the terminals 11 are accessible from the outside, making it easy to fit and remove the electronic components 3a, 3b, 3c.

The bearing 5 is held on the exciting armature by screws 19, which for example screw into the laminations that make up the magnetic mass of the rotor.

In the example considered, the terminals 11 are produced monolithically with at least a part of the tracks 9, by cutting and bending a conducting metal sheet, for example made of copper or of a conducting alloy.

The terminals 11 are preferably of the female fast on type, comprising two wings folded over towards one another to accept male fast on connectors 12 carried by the components 3a, 3b and 3c.

The tracks 9 may also be connected to male connectors that constitute the junctions 10a in the diagram of FIG. 1, and connected to the cables of the exciting armature 2. The connection may be made by soldering the winding wire to the connector.

The tracks 9 may be held on the bearing 5 in various ways, for example by overmoulding as in the example of FIGS. 2 to 4. In that case, the studs 13 and the terminals 11 and 10a protrude from the thermoplastics material of the bearing 5. Apertures 32 may be formed through the bearing 5 to save on thermoplastics material and lighten the bearing.

In the alternative form depicted in FIG. 6, the tracks 9 are held in some way other than by overmoulding on the bearing 5, notably by reliefs 16, as will be described in greater detail in what follows.

The terminals 11 are arranged in such a way that the electronic components 3a, 3b, 3c can be plugged in by a translational movement, for example parallel to the axis of rotation of the rotor as in the examples illustrated.

The components 3a, 3b and 3c are mechanically locked in place on the terminals 11.

This locking can be achieved, as illustrated, using threaded studs 36 positioned between the terminals, and using a corresponding opening 37 made through the casing of the components 3a, 3b or 3c. Nuts 17 are screwed onto the studs 36 to hold the components 3a, 3b and 3c in place.

In the example of FIGS. 3 to 5, the bearing 5 is monolithic.

In the alternative form depicted in FIG. 6, the bearing 5 is made with a base 5a and a cover 5b, both produced in a thermoplastics material by moulding.

Paths are moulded with the base 5a to accommodate and guide the conducting tracks 9. These paths may have reliefs 16 for holding the tracks 9, which are for example flattened in a plane parallel to the axis of rotation of the rotor, unlike in the example of FIG. 3 in which the tracks are, over most of the portions 38 running between the terminals 11, oriented with their plane perpendicular to the axis of rotation.

The reliefs 16 for example take the form of pins parallel to the axis of rotation.

It may be seen from FIG. 6 that housing walls 40 may be moulded with the base 5a around the terminals 11, the housings having a rectangular cross section with one or more slots 41 to the outside for the passage of the tracks 9.

The cover 5b of the bearing 5 comprises openings 45 arranged in such a way that the threaded studs 13 can protrude out from the cover, openings 46 for the connectors 10a and bosses 48 provided with openings 49 for accessing the terminals 11. These openings 49 may be defined by facets 50 converging towards the terminal 11 and the plug-in axis. The cover 5b may be moulded with studs 52 which fit into corresponding openings 53 in the base 5a and through which the screws 19 pass.

The invention is not restricted to the examples that have just been described.

Although the electronic power supply circuit supplying power to the set of polar wheel field windings is a rectifier in the examples illustrated, components other than diode bridges may be used, for example transistors and/or radiofrequency communications or regulation modules, it being possible for the set of polar wheel field windings to be powered using PWM control for example.

Connectors other than fast on connectors may be used.

The threaded studs 13 may be replaced by other types of insert.

The conducting tracks 9 may be produced in some way other than by cutting out, for example using electrochemical etching, the bearing 5 comprising a printed circuit.

The rotor may be a multiple-phased rotor other than a three-phased rotor while at the same time remaining double-wounded, so that each phase is associated with a rectifier bridge, each half of the bridge providing full-wave rectification of the voltage of one winding of the phase.

The invention claimed is:

1. Alternator rotor, comprising:
   a set of polar wheel field windings,
   an exciting armature, and
   an electronic power supply circuit supplying power to the set of polar wheel field windings from the exciting armature,
   wherein the electronic power supply circuit comprises a support made of insulating material and conducting tracks held by said support, these tracks connecting the exciting conductors to terminals, in the form of connectors, into which electronic components of the electronic power supply circuit are plugged and locked mechanically in place,
   wherein the terminals are produced monolithically with at least a part of the conducting tracks,
   wherein the conducting tracks are electrically in contact with threaded studs for the attachment of cable terminals connected to cables of the alternator, and
   wherein the terminals are produced by bending the metal used to make the conducting tracks, with the said metal having been cut out from sheet.

2. Rotor according to claim 1, the terminals constituting fast on connectors, the electronic components being provided with complementary fast on connectors.

3. Rotor according to claim 2, the terminals constituting female fast on connectors, the electronic components being provided with complementary male fast on connectors.

4. Rotor according to claim 1, said cables of the alternator being connected to the set of polar wheel field windings.

5. Rotor according to claim 1, the electronic components being diode bridges.

6. Rotor according to claim 1, the exciting armature being multiple-phased, and double-wounded, a single-phased diode bridge being associated with each phase, the diode bridges being interconnected.

7. Rotor according to claim 1, the mechanical locking of the electronic components being performed by bolting.

8. Rotor according to claim 1, the conducting tracks being held on the support by the overmoulding of thermoplastics material.

9. Rotor according to claim 1, the conducting tracks being held on the support other than by overmoulding.

10. Rotor according to claim 1, the support being positioned on an end face of the exciting armature, with the terminals projecting outwards.

11. Rotor according to claim 1, the support being produced in the form of a base and a cover comprising openings, paths being formed in the base of the support to hold the conducting tracks.

12. Rotor according to claim 11, ends of the conducting tracks being housed in housings in the base of the support.

13. Alternator comprising a rotor according to claim 1.

* * * * *